US012593240B2

(12) United States Patent
Narayanan Thangaraj et al.

(10) Patent No.: US 12,593,240 B2
(45) Date of Patent: Mar. 31, 2026

(54) DICTIONARY-BASED AI COMPONENTS IN WIRELESS SYSTEMS

(71) Applicant: InterDigital Patent Holdings, Inc., Wilmington, DE (US)

(72) Inventors: Yugeswar Deenoo Narayanan Thangaraj, Chalfont, PA (US); Ghyslain Pelletier, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 273 days.

(21) Appl. No.: 18/034,504

(22) PCT Filed: Oct. 25, 2021

(86) PCT No.: PCT/US2021/056428
§ 371 (c)(1),
(2) Date: Apr. 28, 2023

(87) PCT Pub. No.: WO2022/093678
PCT Pub. Date: May 5, 2022

(65) Prior Publication Data
US 2023/0403601 A1     Dec. 14, 2023

Related U.S. Application Data

(60) Provisional application No. 63/107,093, filed on Oct. 29, 2020.

(51) Int. Cl.
*H04W 28/02* (2009.01)
*H04L 5/00* (2006.01)
*H04L 45/02* (2022.01)

(52) U.S. Cl.
CPC ....... *H04W 28/0273* (2013.01); *H04L 5/0053* (2013.01); *H04L 45/08* (2013.01)

(58) Field of Classification Search
CPC .. H04W 28/0273; H04L 5/0053; H04L 45/08; G06N 3/044; G06N 3/045; G06N 3/042; G06N 3/084
See application file for complete search history.

(56) References Cited

U.S. PATENT DOCUMENTS

| | | | | |
|---|---|---|---|---|
| 2022/0077879 A1* | 3/2022 | Husain | ................. | H04B 1/0003 |
| 2022/0291326 A1* | 9/2022 | Zhang | ................... | G06N 3/044 |

(Continued)

FOREIGN PATENT DOCUMENTS

WO        2020/143902 A1     7/2020

OTHER PUBLICATIONS

Gunduz et al., "Machine Learning in the Air", IEEE Journal on Selected Areas in Communications, vol. 37, No. 10, Oct. 2019, pp. 2184-2199.
3rd Generation Partnership Project (3GPP), TS 38.213 V15.3.0, "3rd Generation Partnership Project (3GPP)", Technical Specification Group Radio Access Network, NR, Physical Layer Procedures for Control (Release 15), Sep. 2018, pp. 1-101.

(Continued)

*Primary Examiner* — Hoang-Chuong Q Vu
(74) *Attorney, Agent, or Firm* — Condo Roccia Koptiw LLP

(57)                 ABSTRACT
A wireless transmit-receive unit (WTRU) may be configured to perform one or more actions. A first transmission of a first type and a second transmission of a second type may be received. The first transmission and the second transmission may be determined to be linked based on a time frequency relationship or configuration information. First control information may be determined based on the first transmission and pre-defined processing rules. The second transmission may be provided as an input to an artificial intelligence (AI) component and may cause the AI component to generate second control information as an output. A loss value may be determined based on a difference between the first control information and the second control information. The loss value may be used to train the AI component. The training (Continued)

of the AI component may be determined to satisfy a condition. An indication of the determination may be transmitted.

20 Claims, 12 Drawing Sheets

(56)                    References Cited

U.S. PATENT DOCUMENTS

| 2022/0335560 A1* | 10/2022 | Yoo ........................... | G06N 3/09 |
| 2023/0004864 A1* | 1/2023 | Wang .................... | H04W 24/04 |
| 2023/0082173 A1* | 3/2023 | Li ........................... | G06N 20/00 |
| | | | 713/168 |
| 2023/0197091 A1* | 6/2023 | Venkatraman ......... | G06N 3/084 |
| | | | 704/200 |

OTHER PUBLICATIONS

3rd Generation Partnership Project (3GPP), TS 38.321 V15.1.0, "Technical Specification Group Radio Access Network, NR, Medium Access Control (MAC) Protocol Specification (Release 15)", Mar. 2018, pp. 1-67.
3rd Generation Partnership Project (3GPP), TS 38.331 V15.4.0, "Technical Specification Group Radio Access Network, NR, Radio Resource Control (RRC) Protocol Specification (Release 15)", Dec. 2018, pp. 1-474.

* cited by examiner

DICTIONARY-BASED AI COMPONENTS IN WIRELESS SYSTEMS

CROSS-REFERENCE TO RELATED APPLICATIONS

This application is the National Stage Entry under 35 U.S.C. § 371 of Patent Cooperation Treaty Application No. PCT/US2021/056428, filed Oct. 25, 2021, which claims the benefit of Provisional U.S. Patent Application No. 63/107,093, filed Oct. 29, 2020, the disclosure of which is incorporated herein by reference in its entirety.

BACKGROUND

Mobile communications using wireless communication continue to evolve. A fifth generation of mobile communication radio access technology (RAT) may be referred to as 5G new radio (NR). A previous (legacy) generation of mobile communication RAT may be, for example, fourth-generation (4G) long-term evolution (LTE). Wireless communication devices may establish communications with other devices and data networks, e.g., via an access network, such as a radio access network (RAN).

SUMMARY

Systems, methods, and instrumentalities are disclosed herein for dictionary-based artificial intelligence (AI) components in wireless systems. A wireless transmit-receive unit (WTRU) may comprise a processor configured to perform one or more actions. The processor may be configured to receive a first transmission and a second transmission. The first transmission may be a first type of transmission and the second transmission may be a second type of transmission. The processor may be configured to determine that the first transmission and the second transmission are linked based on a time frequency relationship or configuration information. The processor may be configured to determine first control information based on the first transmission and pre-defined processing rules. The processor may be configured to provide the second transmission as an input to an artificial intelligence (AI) component. The second transmission being provided as input to the AI component may cause the AI component to generate second control information as an output. The processor may be configured to determine a loss value based on at least a first difference between a first part of the first control information and a first part of the second control information. The loss value may be used to train the AI component to reduce at least the first difference. The processor may be configured to determine that the training of the AI component satisfies a condition and may transmit an indication of the determination that the training of the AI component satisfies the condition.

Figure 1A:
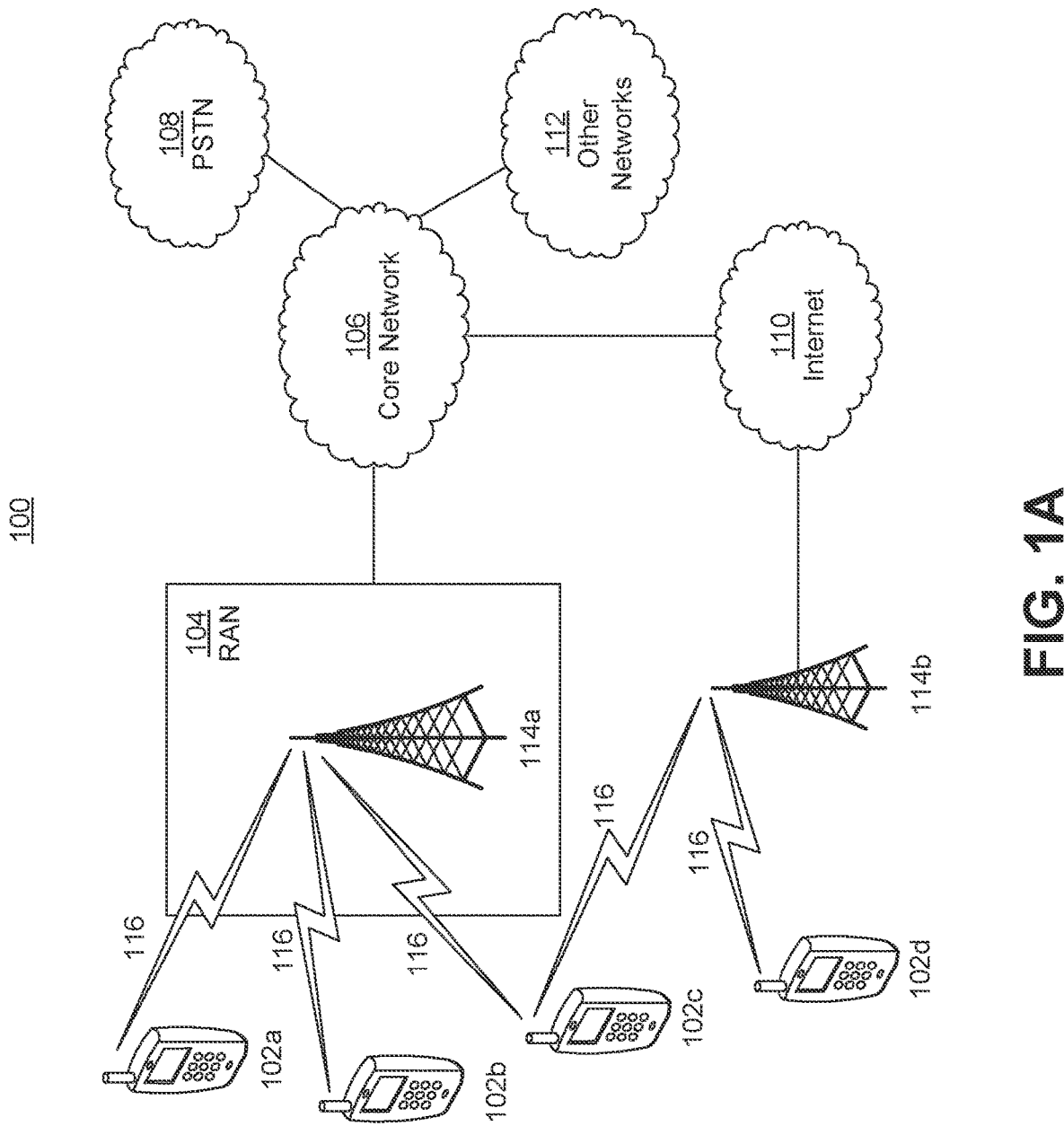
FIG. 1A is a system diagram illustrating an example communications system in which one or more disclosed embodiments may be implemented.

that may be used within the communications system illustrated in FIG. 1A according to an embodiment.

Figure 1B:
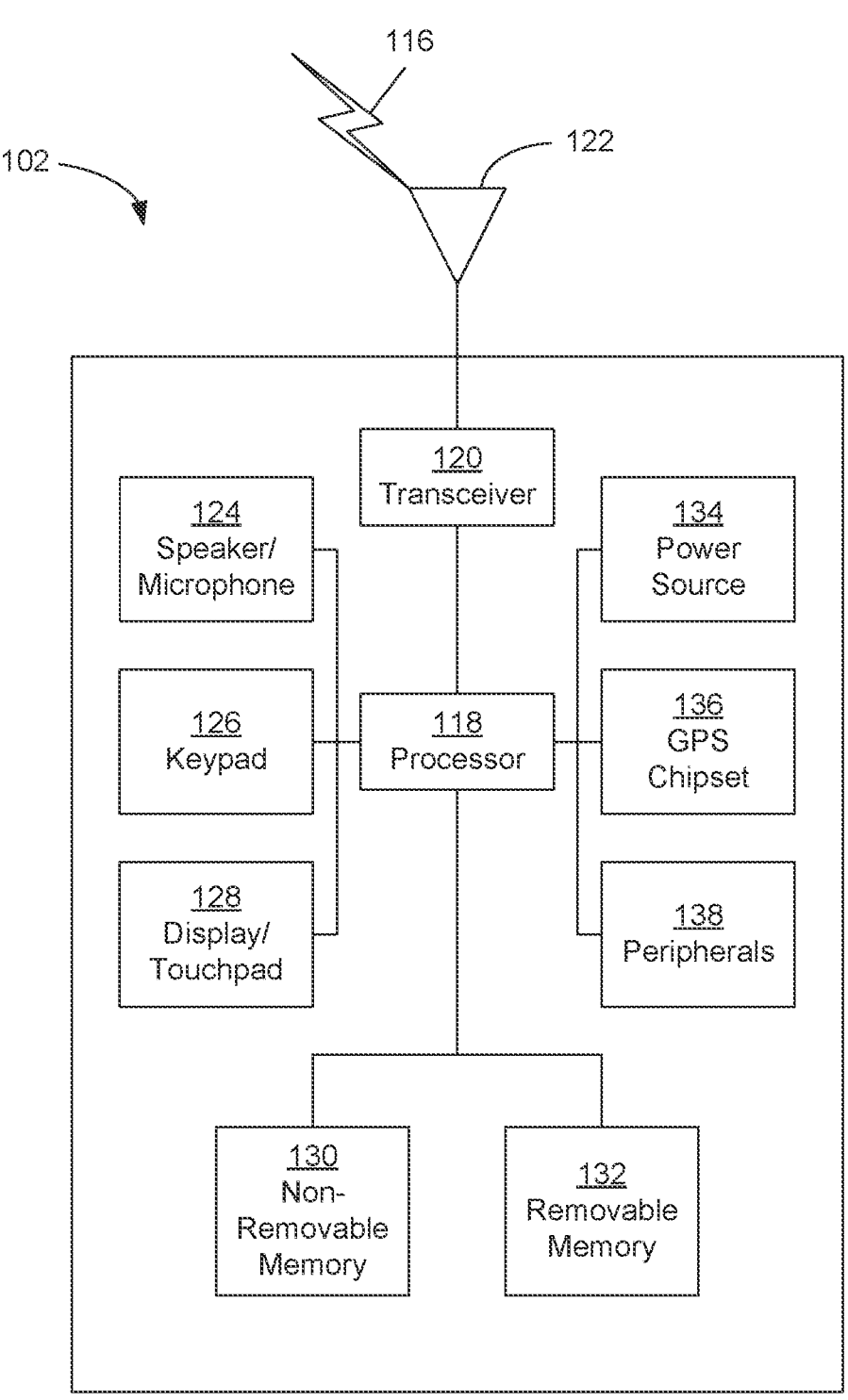
FIG. 1B is a system diagram illustrating an example wireless transmit/receive unit (WTRU) that may be used within the communications system illustrated in FIG. 1A according to an embodiment.
Figure 1C:
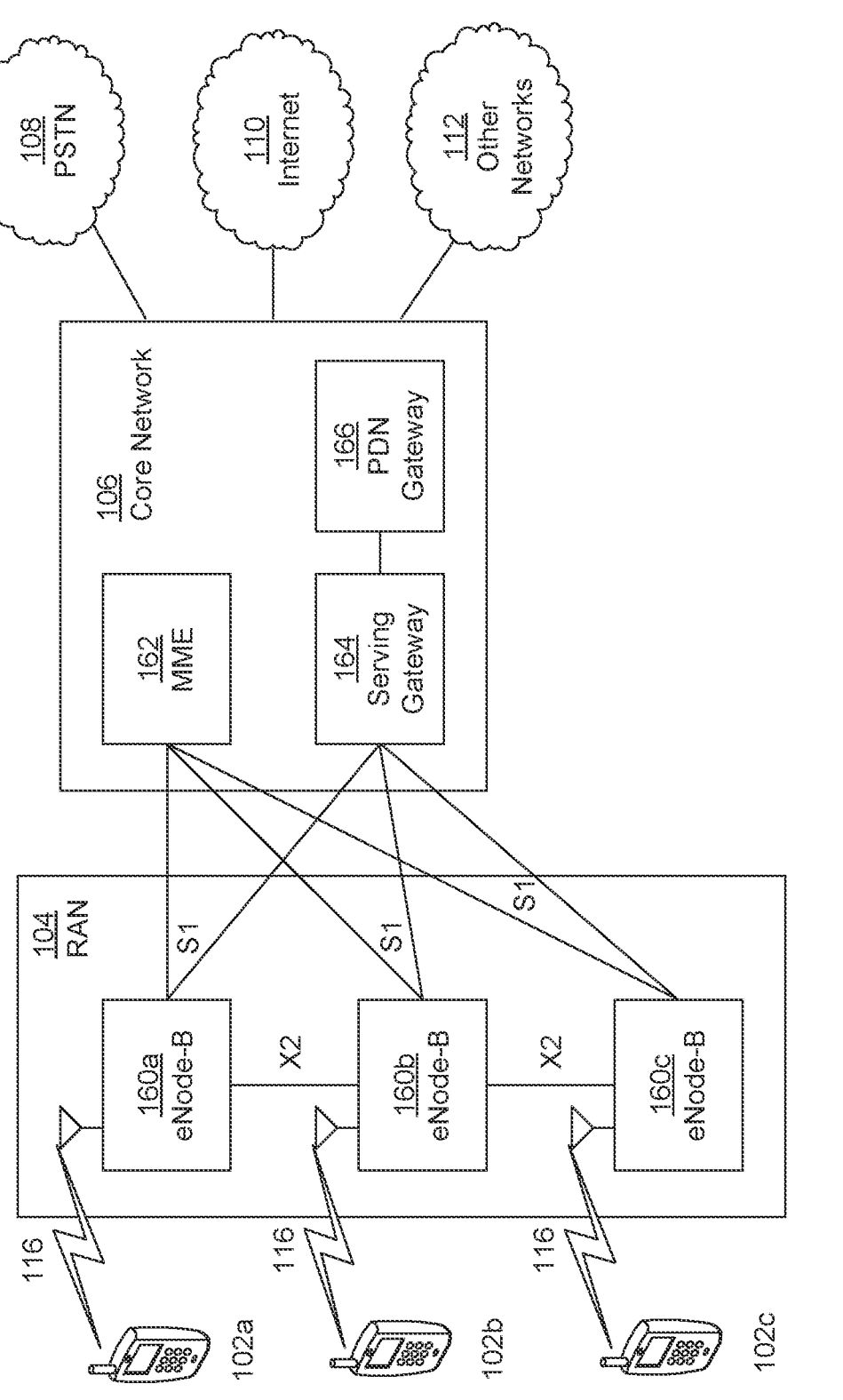
FIG. 1C is a system diagram illustrating an example radio access network (RAN) and an example core network (CN)
Figure 1D:
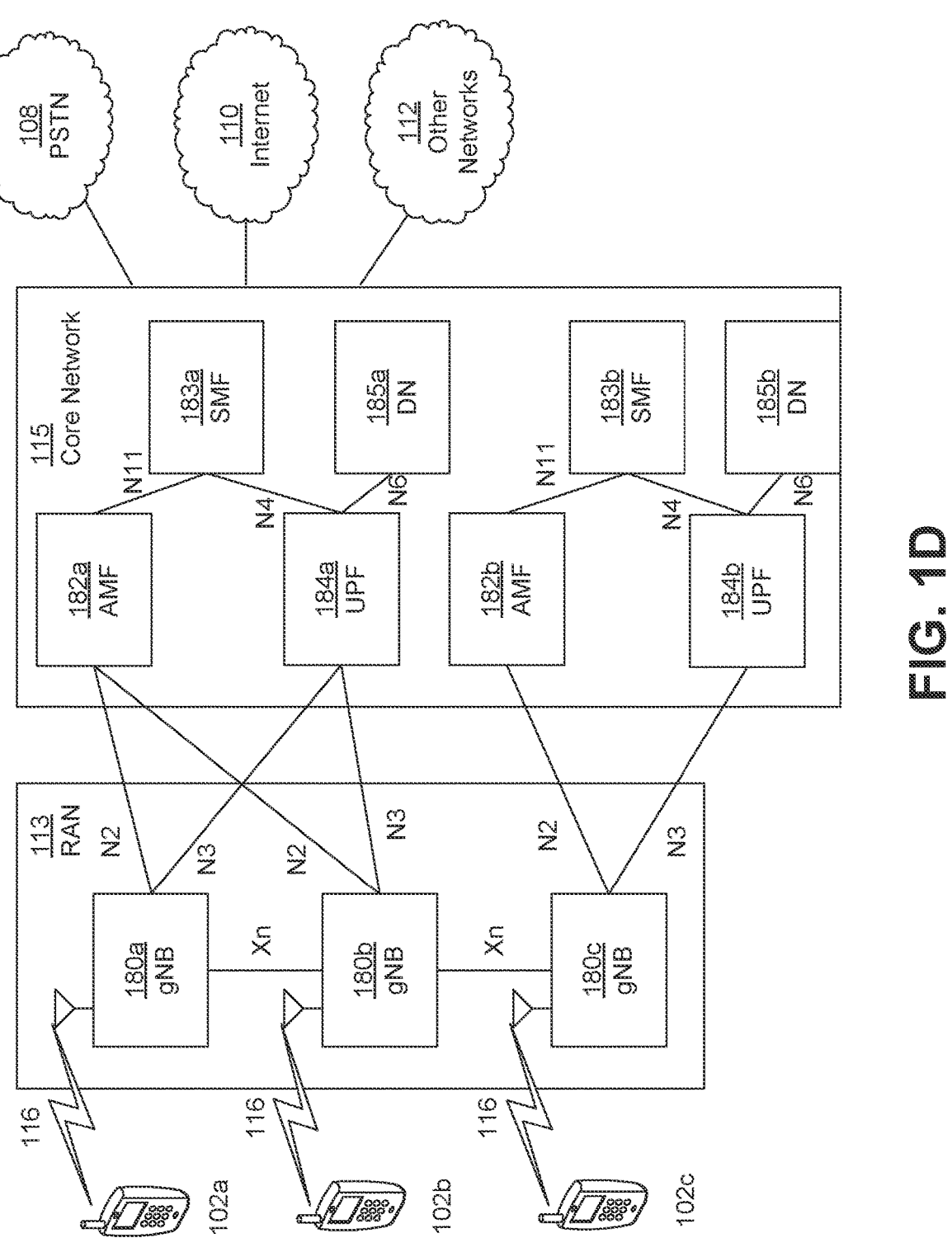

FIG. 1D is a system diagram illustrating a further example RAN and a further example CN that may be used within the communications system illustrated in FIG. 1A according to an embodiment.

Figures 2, 3:
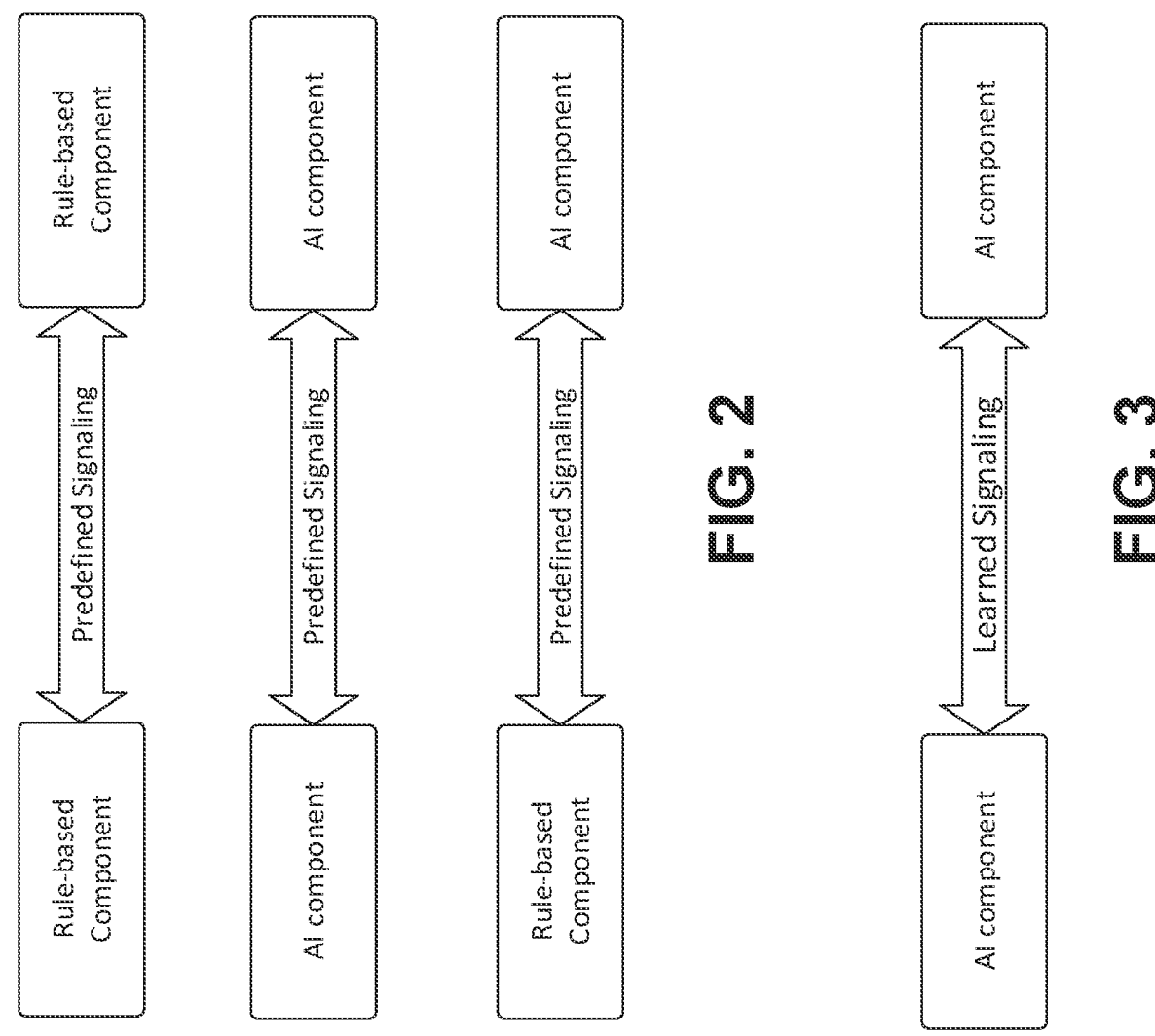

FIG. 2 illustrates an example of interoperability of different components.

FIG. 3 illustrates an example of interoperability of AI components.

Figure 4:
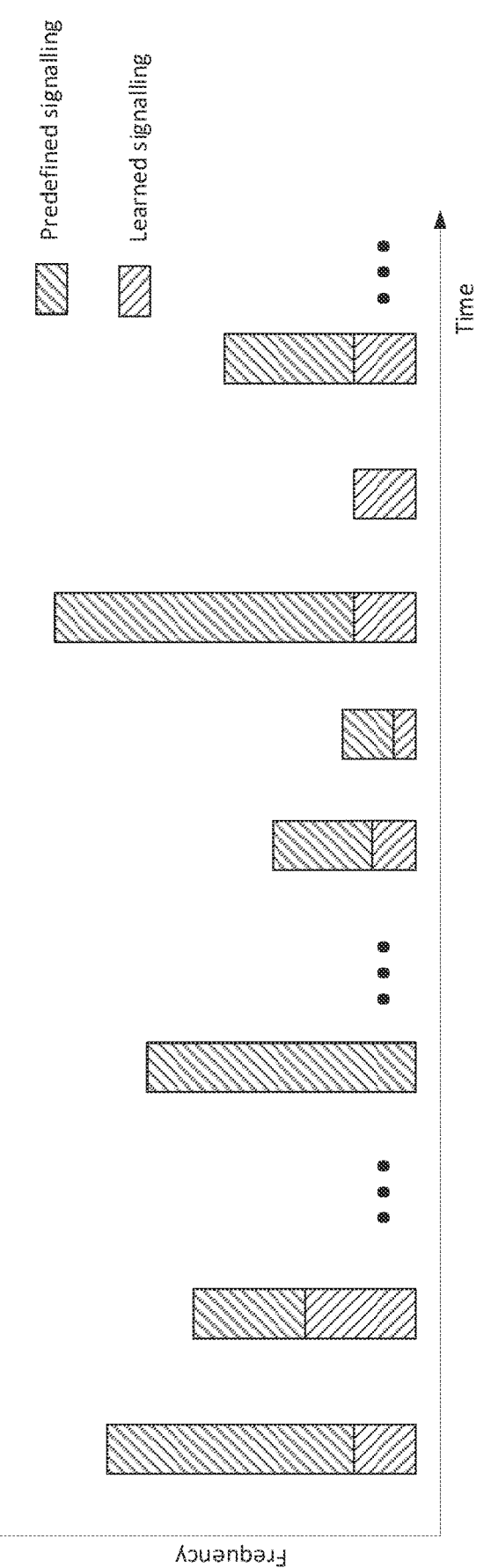

FIG. 4 illustrates an example of an adaptation of learned signaling and predefined signaling.

Figure 5:
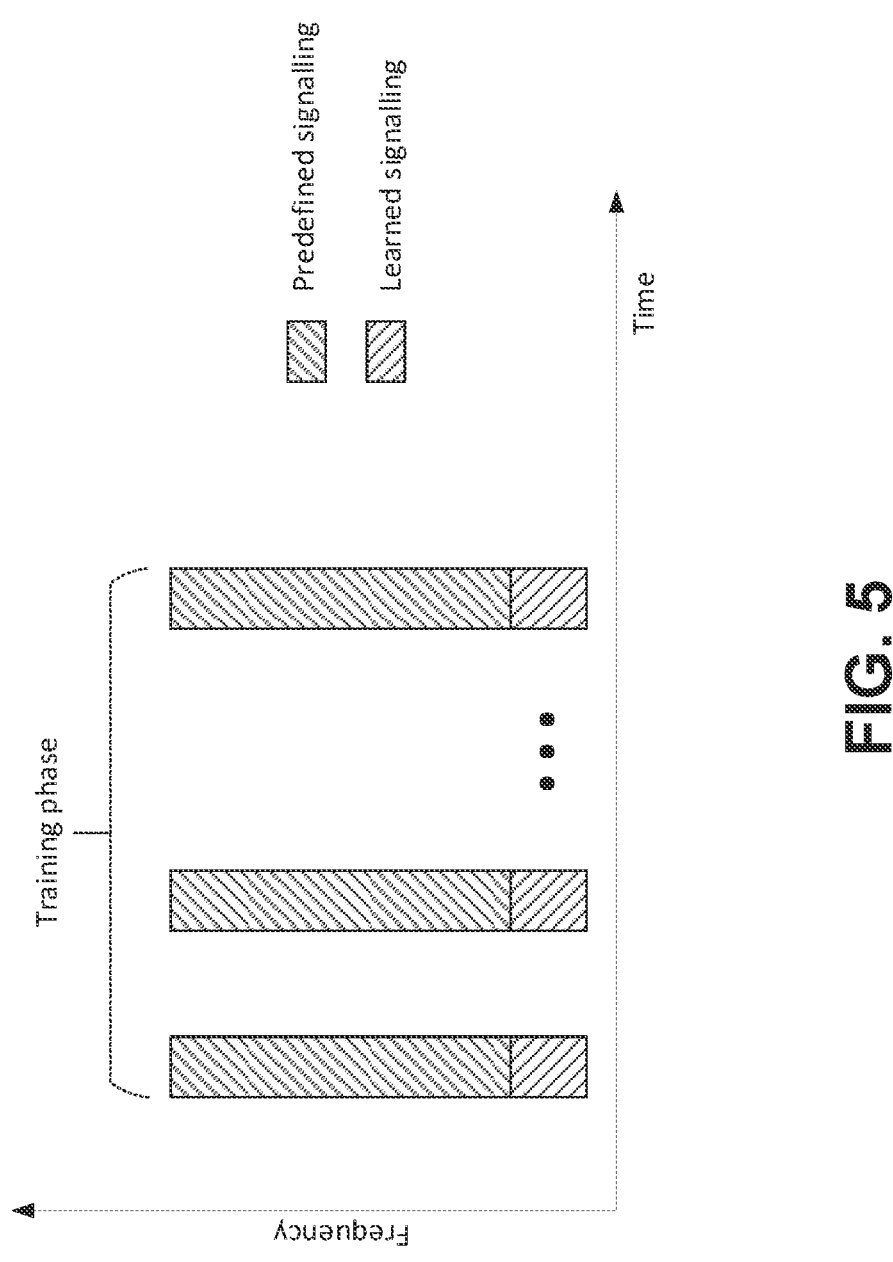

FIG. 5 illustrates an example of tightly coupled predefined signaling and learned signaling.

Figure 6:
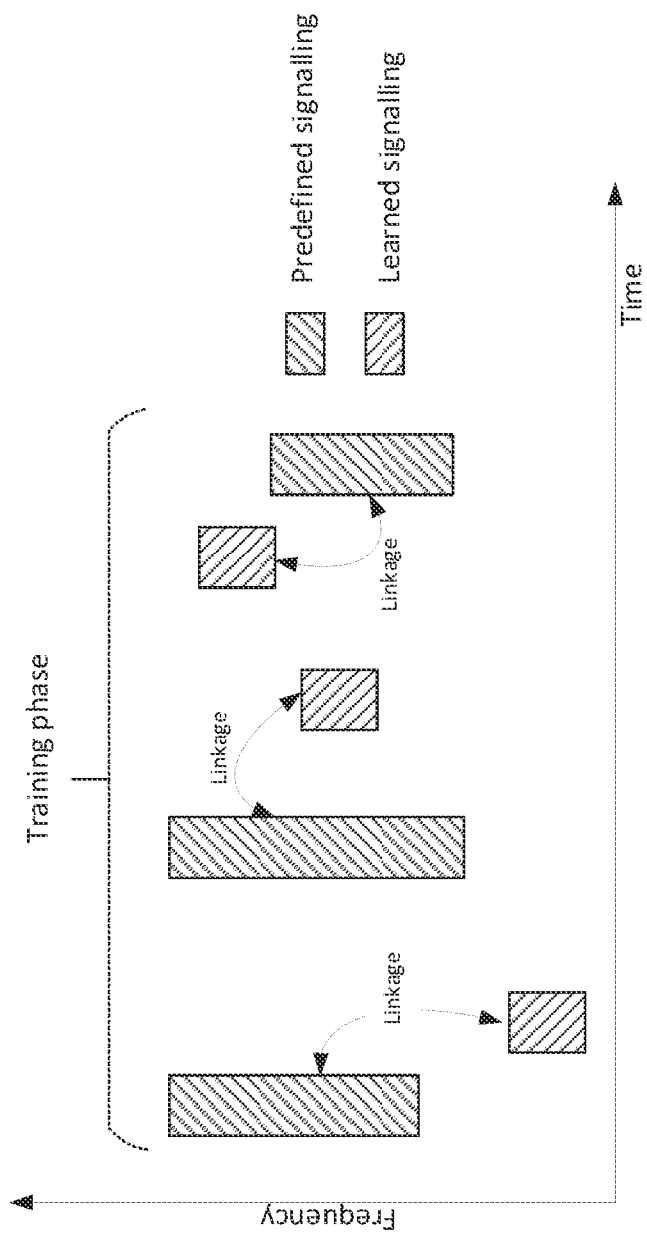

FIG. 6 illustrates an example of a linkage between predefined and learned signaling.

Figure 7:
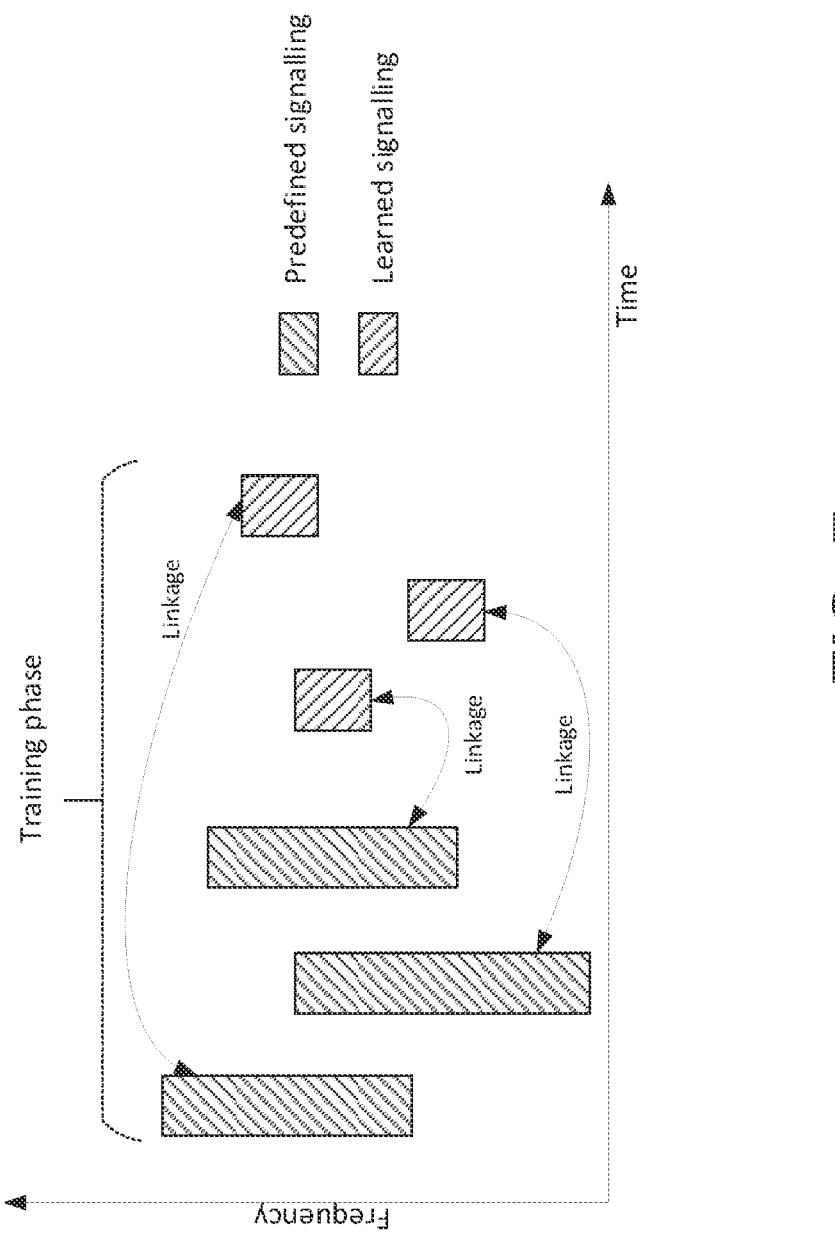

FIG. 7 illustrates an example of a flexible linkage between predefined and learned signaling.

Figure 8:
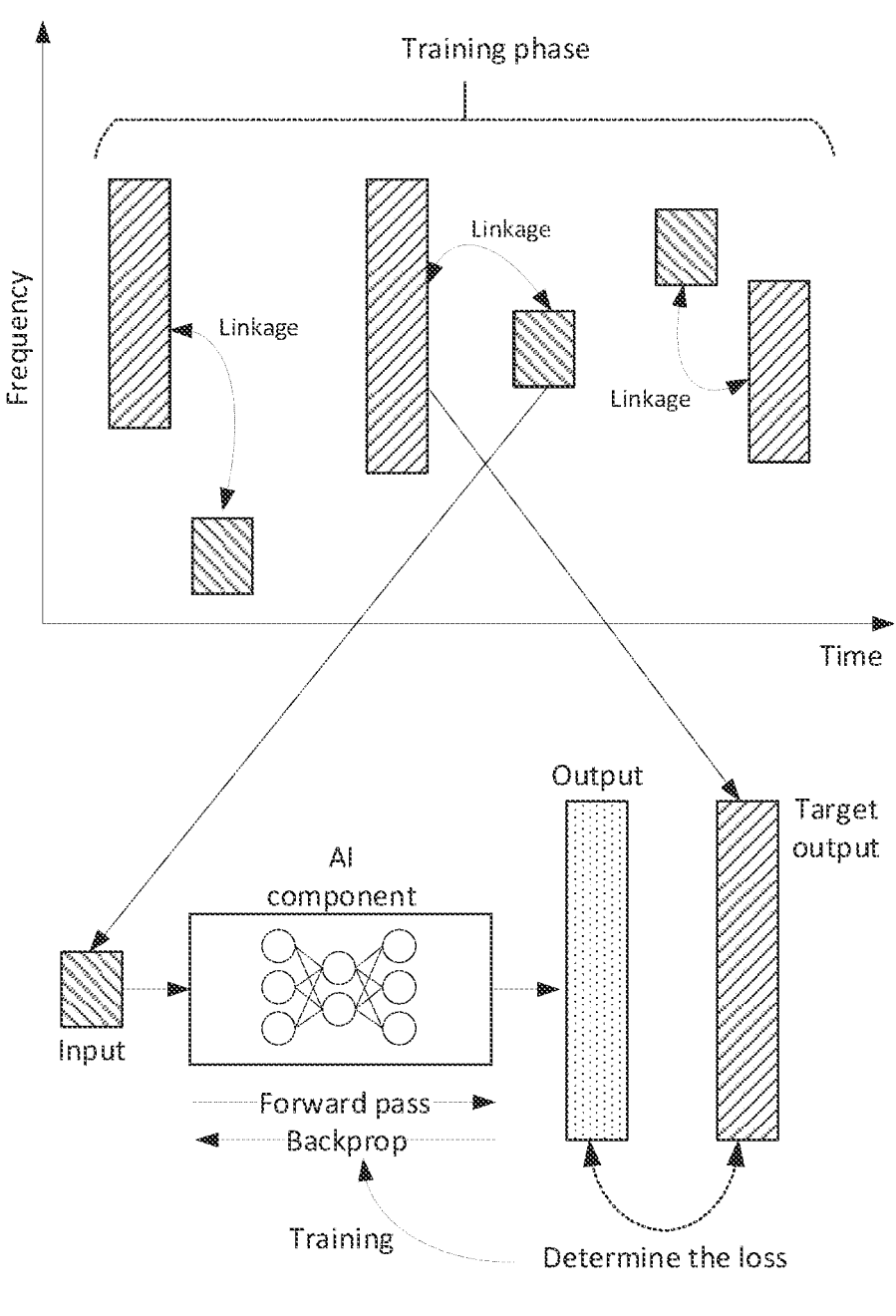

FIG. 8 illustrates an example of training an AI component at a WTRU.

Figure 9:
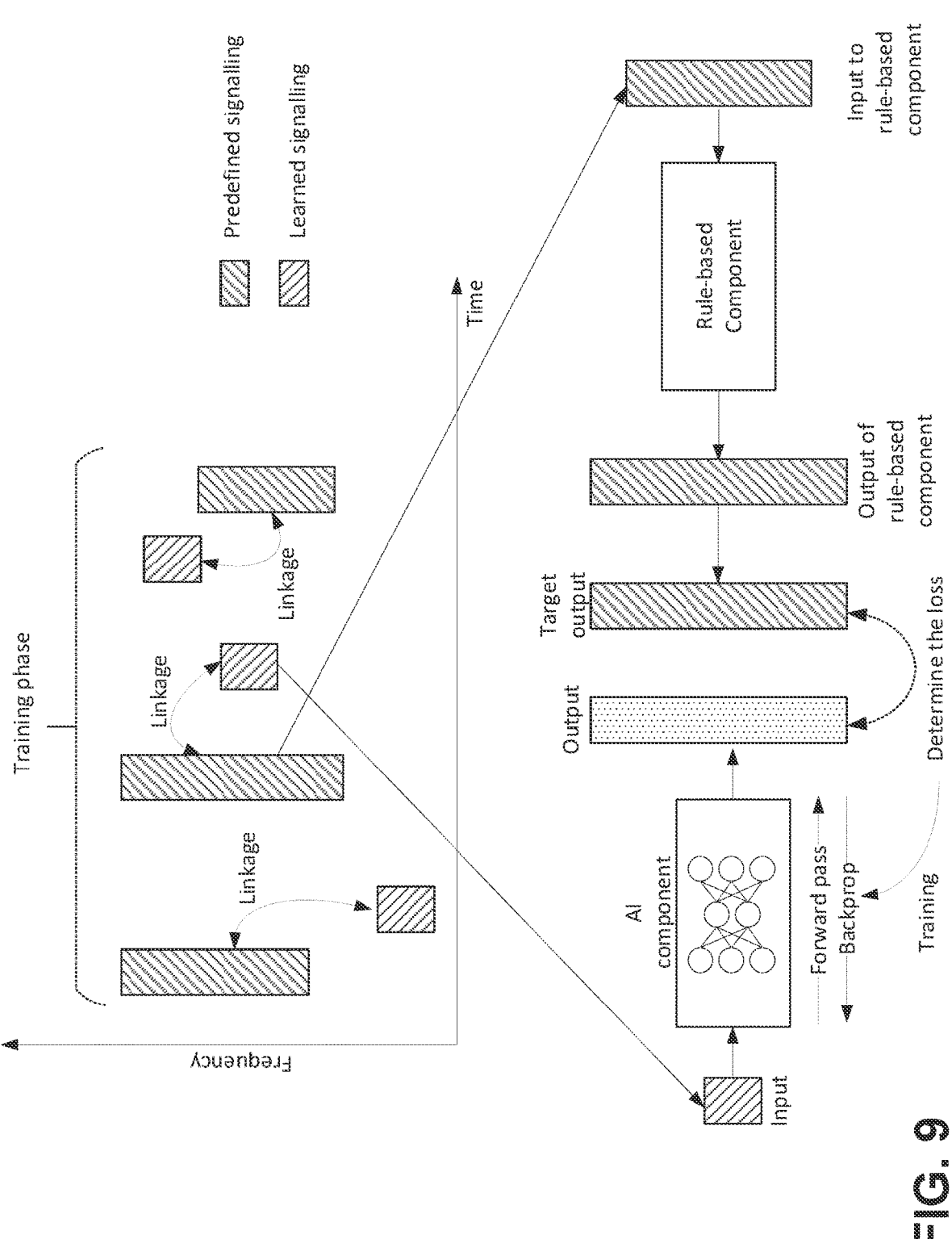

FIG. 9 illustrates another example of training an AI component at a WTRU.

Figure 10:
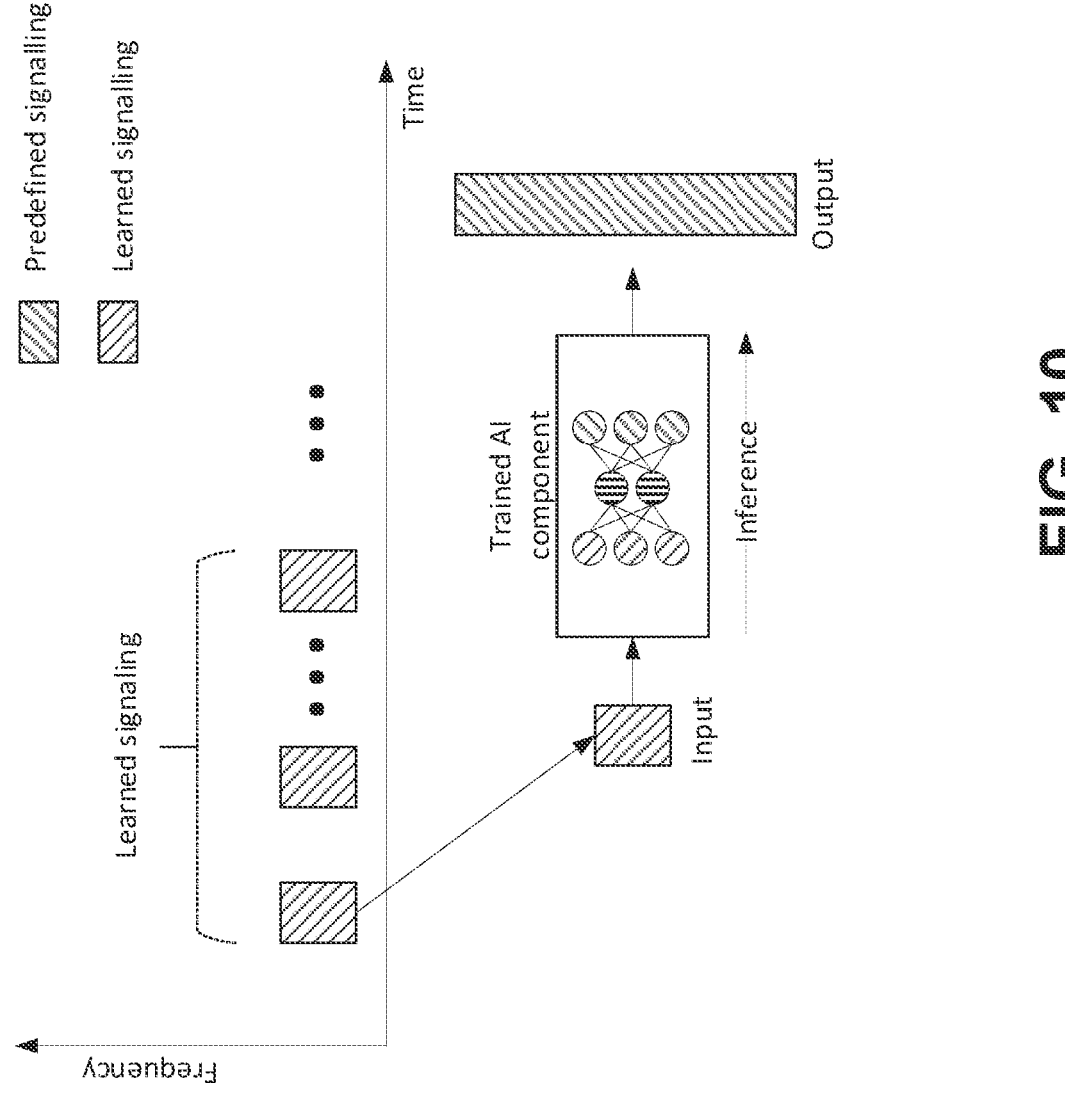

FIG. 10 illustrates an example of processing of learned signaling.

DETAILED DESCRIPTION

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an encode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR, etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ M IMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM)

radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Systems, methods, and instrumentalities are disclosed herein for dictionary-based artificial intelligence (AI) components in wireless systems. AI-based wireless functions and definitions may be interoperable, implementation-based, and/or controlled by a network entity. Various AI-based solutions may be implemented in a WTRU and/or in a network (e.g., in layer 1 (L1), L2 and/or L3). AI-based solutions may be implemented, for example, using a radio resource control (RRC)/control plane and/or a layer 2 (L2)/user plane.

For example, a wireless transmit/receive unit (WTRU) may be configured to receive a first transmission of a first type and a second transmission of a second type. The first transmission and the second transmission may be differentiated, for example, in terms of waveform, modulation, coding, bit arrangement, compression, and/or the like. The second transmission of the second type may be linked to the first transmission of the first type, for example, (e.g., implicitly) based on a time/frequency relationship and/or (e.g., explicitly) based on a configuration. First control information may be determined, for example, based on the first transmission of the first type. A first AI component may be trained to provide the first control information or a part of the first control information as output, for example, if the second transmission of the second type is provided as input. An indication may be transmitted (e.g., by a WTRU to a network), for example, based on (e.g., upon successfully) training the first AI component.

For example, a WTRU may be configured with a first AI component. The WTRU may receive a command to activate the first AI component. The WTRU may receive a third transmission of a second type. The WTRU may apply the third transmission, for example, as an input to the first AI component. The WTRU may determine second control information, for example, based on the output of the first AI component. The WTRU may perform actions according to the second control information (e.g., downlink (DL) reception and/or uplink (UL) transmission).

AI components may be configured, trained and/or controlled, for example, to generate and/or process control signaling in an interoperable way (e.g., between AI components and/or between AI and legacy components). AI components may be trained to detect transmission properties (e.g., modulation schemes), for example, without explicit direction. Using AI components in a processing chain may support (e.g., enable) dynamic adaptation of properties associated with transmissions to achieve efficient control signaling between nodes. Transmission properties may include, for example, waveform, modulation, constellation, coding, compression, bit arrangement, and/or the like. Adaptation may be performed, for example, based on a channel condition, quality of service, WTRU power saving, cell load, interference, WTRU/NW capability, and/or the like.

Systems, methods, and instrumentalities for dictionary-based artificial intelligence (AI) components in wireless systems are described (e.g., by way of non-limiting examples) without limitation and may be applicable to any wireless technology and/or other technology. The term network (NW) may refer to one or more base stations (e.g., gNB(s)), which may be associated with one or more transmission/reception points (TRPs), and/or may refer to any other node in a radio access network (RAN).

Artificial intelligence (AI) may be defined as a behavior exhibited by a machine that mimics cognitive functions to sense, reason, adapt, and/or act.

Machine learning (ML) may refer to a type of algorithms that solve a problem based on learning through experience (e.g., data), for example, without (e.g., explicitly) being programmed (e.g., configuring a set of rules). Machine learning may be considered a subset of AI. Different machine learning paradigms may be based on the nature of data and/or feedback available to a learning algorithm. A supervised learning approach may involve learning a function that maps an input to an output, for example, based on a labeled training example. A training example (e.g., each training example) may include an input and a corresponding output. An unsupervised learning approach may involve detecting patterns in data, for example, without pre-existing label(s). A reinforcement learning approach may involve performing a sequence of actions in an environment, for example, to maximize a reward (e.g., a cumulative reward). A reward may be an input to a learning algorithm, which may optimize action(s) (e.g., a sequence of actions). A reward may be positive if action(s) achieve desired objective(s). A reward may be negative if action(s) do not achieve desired objective(s). In some examples, one or more machine learning algorithms may be applied using a combination or an interpolation of approaches (e.g., one or more of the approaches described herein). For example, a semi-supervised learning approach may use a combination of a small amount of labeled data with a large amount of unlabeled data, e.g., during training. Semi-supervised learning may fall between unsupervised learning (e.g., without labeled training data) and supervised learning (e.g., with labeled training data).

Deep learning (DL) may refer to a class of machine learning algorithms that employ artificial neural networks (e.g., deep neural networks (DNNs)), which may be loosely inspired by biological system(s). DNNs may be a special class of machine learning models (e.g., inspired by the human brain), where the input may be linearly transformed and may pass through a non-linear activation function multiple times. DNNs may include multiple layers, where a layer (e.g., each layer) may include a linear transformation and one or more non-linear activation functions. DNNs may be trained (e.g., using training data) via a back-propagation algorithm. DNNs may be implemented in a variety of domains (e.g., speech, vision, natural language, etc.) and for various machine learning settings (e.g., supervised, unsupervised, and/or semi-supervised).

Auto-encoders may be a specific class of DNNs. Auto-encoders may arise (e.g., be used) in the context of an unsupervised machine learning setting, for example. High-dimensional data may be non-linearly transformed to a lower-dimensional latent vector using a DNN based encoder. The lower-dimensional latent vector may be used to re-produce the high-dimensional data, for example, using a non-linear decoder. An encoder may be represented as E (x; $W_e$), where x may be high-dimensional data and $W_e$ may represent the parameters of the encoder. A decoder may be represented as D (z; $W_d$), where z may be the low-dimensional latent representation and $W_d$ may represent the parameter(s) of the encoder. An auto-encoder may be trained using training data $\{x_1, \ldots, x_N\}$ to solve the optimization problem shown in Eq. (1):

$$\{W_e^{tr}, W_d^{tr}\} = \arg\min_{W_e, W_d} \sum_{i=1}^{N} \|x_i - D(E(x_i; W_e); W_d)\|_2^2 \quad (1)$$

The problem shown in Eq. (1) may be (e.g., approximately) solved, for example, using a backpropagation algorithm. The trained encoder $$E(x; W_e^{tr})$$

may be used to compress the high-dimensional data and the trained decoder $$D(z; W_d^{tr})$$

may be used to decompress the latent representation.

The terms artificial intelligence (AI), machine learning (ML), deep learning (DL), and DNNs may be used interchangeably. Methods described herein (e.g., by way of non-limiting examples) may be based on learning in wireless communication systems. Systems, methods, and instrumentalities for dictionary-based artificial intelligence (AI) components described herein are not limited to scenarios presented in examples. Systems and services and may be applicable to any type of transmissions and services, etc.

Recurrent neural networks (RNNs) (e.g., algorithms) may be used to model sequential data. RNNs may include internal memory that enables a model to remember previous input(s) as well as current input(s), e.g., to help sequence modelling. An output for a step within the neural network may depend on a current input and/or on an output generated at previous steps. An RNN may exemplify how a neural network can track evolving conditions for a given task, for example, in terms of tracking the impact of the changes in a channel/radio, change in latency, bitrate, jitter (e.g., for the purpose of determining how to apply quality of service (QoS) treatment on a per-packet basis for a given flow), and/or the like.

Artificial intelligence may be supported within a communication protocol stack, for example, in terms of predictability, network control, interoperability of AI/ML operating over a wireless interface, etc. There may be interoperability between communicating nodes over an interface, for example, if AI-based communication(s) are enabled. In some examples, legacy component(s) may be combined with AI-based component(s) within a protocol implementation.

A determination may be made between an optimal and suitable model versus the size of a model for one-size-fits-all. Performance (e.g., optimal performance) may be obtained as a function of the terminal device(s), across different network implementations, different verticals, across different deployments and/or across different connectivity paradigms (e.g., in a one-size-fits-all manner). A network may adapt the degree to which AI component(s) (e.g., various AI components) are used by a WTRU, for example, to control the aspect(s) that may be beneficial to be learned.

Methods may be implemented for dictionary-based AI in communication protocol(s). The term "rule-based" components may refer to WTRU behavior(s) and/or requirements (e.g., specified WTRU behavior(s) and/or requirement(s)), which may be explicitly defined in the form of procedural text, signaling syntax, and/or the like. For example, a logical channel prioritization (LCP) procedure may define WTRU behavior(s)/requirement(s) (e.g., based on a medium access control (MAC) specification).

Interoperable/compliant implementation-based AI between nodes may be enabled. Interoperable, implementation-based, AI-based wireless functions and/or definitions may be controlled, for example, by a network entity. One or more fixed elements (e.g., input parameter(s)) and a set (e.g., finite set) of possible bit arrangement(s) (e.g., syntax) may be defined (e.g., configured) and may be available to an AI component for processing according to a trained model (e.g., configured as an alternative to rule-based processing). A trained model may implement retraining (e.g., real-time retraining), for example, using a non-critical extension available within the syntactic model of the function(s) (e.g., so that part of the bit arrangement(s) is/are fixed by definition and other parts may be learned). Training/learning may enable proprietary optimization(s) to an interoperable protocol, for example, in the form of an embedded signaling channel (e.g., as part of a non-critical extension part of a specified bit arrangement).

Systems and methods described herein may be applicable to a communication link (e.g., any communication link) that includes two (e.g., point-to-point) or more (e.g., point-to-multipoint) communication devices, such as 3GPP LTE Uu, 3GPP NR Uu, 3GPP Sidelink, IEEE WiFi technologies (e.g., including protocols for wireless air interfaces and device-to-device communications), etc.

A dictionary, syntax, and/or input/output format may be specified/configured for use by an AI model. An AI model may be trained to implement one or more functions, e.g., using a dictionary. A dictionary may correspond to one or more protocol fields, variables, or parameters for input and/or for output of concerned function(s). A trained model may use syntactic rules, for example, if the function(s) generate a bit arrangement for transmission over a communication medium (e.g., as input to another function in the processing chain for a concerned transmission). Configuration aspects of a device implementing one or more methods may include one or more of a dictionary, syntactic rules, fields, variables, or parameters for a function. A resulting bit arrangement may be interoperable with other device(s) (e.g., a device implementing a corresponding receiving function as a rule-based function). In some examples, the term "dictionary" may include aspects of transmission, such as modulation, constellation, and coding scheme applied to transmissions. For example, a dictionary may include vocabulary (e.g., all possible vocabulary, including predefined vocabulary and learned vocabulary) between two components.

The extent of AI within a protocol may be introduced and/or controlled. A protocol layer may be defined, for example, using one or more processing blocks. A processing block (e.g., each processing block) may have defined/specified input(s) and outputs. A processing block may be implemented, for example, as rule-based step(s) or by using an AI/machine learning component (e.g., a filter). A processing block may be configured (e.g., dynamically), e.g., to be rule-based or AI component-based. An AI component may be configurable to achieve different levels of performance, such as configurable processing complexity, accuracy, power consumption, granularity, reduced overhead (e.g., operation with few or no pilots), etc.

A function associated with a protocol layer may be implemented, for example, by one process block or more than one processing block (e.g., cascading of more than one processing block). A processing block (e.g., each processing block) may implement one or more sub-tasks. In some examples, cascading of processing blocks may include piecing together processing blocks (e.g., various processing blocks), e.g., in an interlocking pattern. Processing blocks may be pieced together, for example, in an interlocking arbitrary pattern (e.g., "Lego" like arbitrary pattern(s)). For example, processing blocks may be arranged in sequence. An output of one of the processing blocks may be an input to another processing block. For example, a processing block may be arranged in parallel. An output of one processing block may be an input to two or more processing blocks. An output of two or more processing blocks may be an input to one processing block. For example, an input of a processing block at time T may be an output of the same or different processing block from T-n. The value of n may be preconfigured (e.g., a default may be set to a value equal to 1 or a previous time instance).

There may be multiple (e.g., two) types of processing blocks. The outcome of a first type of processing block may impact one or more of protocol behavior, protocol state, WTRU state, operation of other processing block(s), etc. The outcome of a first type of processing block may not (e.g., directly) generate bit(s), e.g., to be transmitted over the air. A second type of processing block may be generative (e.g., the output of a second type of processing block may result in signal(s) to be transmitted over the air). The term signal(s) and/or signaling may include one or more types (e.g., any type) of transmission, such as one or more physical layer signals, physical layer control messages, MAC control messages, layer 2 (L2) control messages, radio resource control (RRC) control messages, non-access stratum (NAS) control messages, etc. Methods described herein may not be limited to control message(s)/signaling. Methods described herein may be (e.g., broadly) applicable to a type (e.g., any type) of transmission (e.g., which may include a data protocol data unit (PDU) transmission).

Signaling may be predefined. Predefined signaling may refer to transmission(s) and/or reception(s) of signal(s) with syntactic aspect(s) (e.g., bit arrangement/formats, and/or the like), transmission characteristic(s) (e.g., modulation and coding scheme (MCS), precoding, waveform, time/frequency resources, and/or the like), and/or semantic aspects (e.g., configuration, parameterization, and/or the like) that may be chosen (e.g., selected) from a set of predefined vocabulary.

Learned signaling may refer to transmission(s) and/or reception(s) of signal(s) where at least one of syntactic aspects (e.g., bit arrangement/formats, and/or the like), transmission characteristics (e.g., MCS, precoding, waveform, time/frequency resources, and/or the like), or semantic aspects (e.g., configuration, parameterization, and/or the like) may be learned, for example, dynamically (e.g., corresponding to a learned vocabulary, which may be considered as slang). A WTRU may be configured to transmit and/or receive learned signaling. A WTRU may learn (e.g., at least in part) the syntactic aspect, transmission characteristics, and/or semantic aspects of signaling. Learned signaling may achieve reduced processing complexity, reduced power consumption, increased accuracy/granularity, improved multiplexing capability, reduced overhead (e.g., operation with few or no pilots), and/or the like.

Offline learning/training may refer to action(s) of determining and/or adjusting the learnable parameters of an AI component (e.g., weights and/or biases of a machine learning model), for example, using training data that may be created (e.g., synthetically, such as from a simulation of a channel model or a dataset created from a sampling of real-world measurements). Training may be performed during a WTRU implementation.

Online learning/training may refer to action(s) of determining and/or adjusting the AI component (e.g., weights and/or biases of a machine learning model), for example, using training data that may be created based on (e.g., at least in part based on) one or more of the following: channel measurement(s) (e.g., reference signal received power (RSRP), reference signal received quality (RSRQ), signal to interference plus noise ratio (SINR), block error rate (BLER), and/or the like), interference measurement(s), received signals associated with data, control signaling from the NW, WTRU/NW feedback, protocol state(s), protocol status/variable(s), PDU header(s)/data, and/or the like. Online learning may be performed (e.g., in real-time) over a channel over which communication is carried out.

AI components between the WTRU and gNB/side-link WTRU may be interoperable. In some examples, a WTRU may be configured with a processing block and a signaling vocabulary (e.g., a predefined vocabulary) associated with the processing block. A predefined signaling vocabulary may include one or more of a formal bit arrangement, a set of control signaling messages (e.g., all control signaling messages) and headers for data PDUs (e.g., all headers for data PDUs), a packet format, parameter(s), parameter range (s), or the like. A WTRU may implement a processing block using rule-based step(s) and/or using AI component(s), for example, if the output conforms to a specified signaling vocabulary.

FIG. 2 illustrates an example of interoperability of different components. A WTRU may use (e.g., may be configured to use) a signaling vocabulary (e.g., a predefined signaling vocabulary), e.g., for communication between rule-based components. A WTRU may use (e.g., may be configured to use) a signaling vocabulary (e.g., a predefined signaling vocabulary) for communication between a rule-based component and an AI component. A WTRU may be configured to train an AI component, for example, so that the output of the AI component may conform to a signaling vocabulary. A WTRU may be configured to train an AI component offline (e.g., completely offline), for example, to conform to a signaling vocabulary (e.g., a predefined signaling vocabulary). A WTRU may be configured to adapt an AI component, for example, using training and/or retraining online to account for transceiver imperfection(s) (e.g., non-linearit(ies)), channel effect(s), and/or the like.

A WTRU may be configured with an AI component without a signaling vocabulary (e.g., a predefined signaling vocabulary) or an incomplete/limited signaling vocabulary (e.g., an incomplete/limited predefined signaling vocabulary). A WTRU may use (e.g., may be configured to use) learned signaling vocabulary for communication between AI components. FIG. 3 illustrates an example of interoperability of AI components. A WTRU may train (e.g., may be configured to train) an AI component, for example, in coordination with a peer AI component, e.g., to learn the signaling vocabulary (e.g., dynamically) online. A WTRU may be configured to learn a signaling vocabulary online, e.g., over a real channel. A WTRU may be configured to learn a signaling vocabulary, e.g., on-demand. A learned signaling vocabulary may be context-specific/specific for a context (e.g., if a WTRU is configured with a contextual AI component).

An AI component may be (re)trained (e.g., with respect to learned signaling associated with the AI component). A WTRU may be configured with an AI component trained to output a default, predefined, static, and/or initial semantic for a bit arrangement associated with one or more functions of a protocol sublayer. A WTRU may be configured to indicate a capability, possibility, and/or recommendation/need of (re)training and/or fine-tuning an AI component. A WTRU may be configured to perform (re)training and/or fine-tuning of an AI component, e.g., based on one or more of measurements, network feedback, network signaling and/or jointly training with a peer AI component. A WTRU may be configured to update an AI component, for example, so that semantics may be adjusted over time, which may support optimization of communications for a channel, optimization of one or more communication aspects that may not be modeled accurately (e.g., non-ideal transmit/receive components), achieving a performance objective (e.g., latency, power consumption, etc.), optimization of a specific gNB implementation/capability, and/or the like.

There may be multiple degrees of learned signaling. A WTRU may be (pre)configured/(pre)defined with one or more bit arrangements/formats (e.g., reserved code points). A WTRU may learn (e.g., may be configured to learn), e.g., dynamically, an association to a configuration/parameterization. For example, a WTRU may learn what type of waveform (e.g., new waveform), modulation (e.g., new modulation), constellation (e.g., new constellation), and/or coding schemes (e.g., new coding schemes) may be associated with a predefined/reserved value.

A WTRU may be preconfigured with one or more configuration/parameterization sets/groups. A WTRU may be configured to learn (e.g., dynamically) a bit arrangement/format associated with a configuration.

A WTRU may learn (e.g., may be configured to learn), e.g., dynamically, bit arrangement/formats and/or associated configuration/parameterization.

There may be a relationship between predefined signaling and learned signaling. A WTRU may be configured to transmit and/or receive a combination of predefined signaling and learned signaling. A relationship between learned signaling and predefined signaling may be configured, for example, in one or more of the following ways: learned signaling may be complementary to predefined signaling; learned signaling may be additional signaling; or learned signaling may be standalone signaling.

Learned signaling may be complementary to predefined signaling. A WTRU may be configured to receive predefined signaling and/or learned signaling. Learned signaling may enhance the robustness of predefined signaling. For example, learned signaling may provide additional redundancy to predefined signaling. Learned signaling may enable a higher degree of compression. Learned signaling may provide signaling diversity.

Learned signaling may be additional signaling. A WTRU may be configured to receive predefined signaling and/or learned signaling. Learned signaling may provide additional signaling. Additional signaling may be applicable to an AI component. A WTRU may be configured to receive learned signaling, for example, as extension(s) (e.g., non-critical extension(s)) to predefined signaling.

Learned signaling may be standalone signaling. A WTRU may be configured to receive (e.g., mainly) learned signaling. Predefined signaling may be used, for example, as a means to trigger a recovery mechanism. Learned signaling may provide or improve one or more of the following: reliability, flexible adaptation to channel conditions and/or WTRU capabilities, lower power consumption, lower overhead, lower complexity, simplified processing, or the like.

Learned signaling and/or predefined signaling may be adapted. A WTRU may be configured to transmit and/or receive predefined signaling and/or learned signaling. Predefined signaling and learned signaling may be multiplexed in time, frequency, and/or space.

A WTRU may process (e.g., may be configured to process) an amount (e.g., a varying amount) of predefined signaling and/or learned signaling, for example, based on a set (e.g., a predefined set) of conditions/criteria. The conditions may include one or more of the following: a property associated with an AI component; a WTRU RRC state; a WTRU capability; or a QoS.

A WTRU may process (e.g., may be configured to process) an amount (e.g., a varying amount) of predefined signaling and/or learned signaling, for example, based on a property associated with an AI component. A property associated with AI component may be a training status of an AI component. A WTRU with an untrained/incompletely trained AI component may be configured to use predefined signaling. A property associated with AI component may be performance/accuracy of the AI component (e.g., expressed as a loss function). A WTRU with a loss function below a threshold may be configured to trigger training or trigger recovery, e.g., using predefined signaling.

A WTRU may process (e.g., may be configured to process) an amount (e.g., a varying amount) of predefined signaling and/or learned signaling, for example, based on a WTRU RRC state. For example, a WTRU may be configured to apply predefined signaling in an IDLE state. A WTRU may be configured to apply predefined signaling in an INACTIVE state, for example, if a serving cell is different than the last cell in which the WTRU was active. A WTRU may be configured to apply learned signaling in a CONNECTED state, for example, after activation (e.g., explicit activation) from the network. A WTRU may be configured to apply predefined signaling, for example, in the case of a handover to a serving cell (e.g., a new serving cell).

A WTRU may process (e.g., may be configured to process) an amount (e.g., a varying amount) of predefined signaling and/or learned signaling, for example, based on a WTRU capability. A WTRU may be configured to transmit/receive (e.g., predominantly) learned signaling (e.g., instead of predefined signaling), for example, if the WTRU supports AI component(s) with larger storage and/or larger processing capability.

FIG. 4 illustrates an example of an adaptation of learned signaling and predefined signaling.

A WTRU may be configured to process (e.g., only) predefined signaling, (e.g., only) learned signaling or a combination of learned and predefined signaling, for example, based on (e.g., adapted to) various conditions. An association between predefined signaling and learned signaling may follow a linkage option (e.g., as discussed herein).

A WTRU may be configured to transmit and/or receive predefined signaling, for example, for one or more of the following purposes (e.g., different purposes): initialization procedure(s) (e.g., if a WTRU has not established a context network; if a WTRU is not configured with a learned AI component; and/or if a WTRU has an untrained or insufficiently trained AI component); enabling bootstrapping communication between AI components; enabling communication between an AI component and a rule-based component or between rule-based components; configuring/providing training data and/or labels for AI component(s) to learn; or enabling recovery procedure(s).

A WTRU may be configured to receive and/or process a transmission associated with downlink control information (DCI). Transmission characteristics of the transmission may be adapted on the fly. Transmission characteristics may involve waveform, modulation, constellation, coding, compression, bit arrangement, and/or the like. An adaptation may be performed, for example, considering a channel condition, quality of service, WTRU power saving, cell load, interference, WTRU/NW capability, and/or the like. A WTRU may train (e.g., may be configured to train) an AI component to learn a transmission adaptation. A WTRU may activate (e.g., may be configured to activate) an AI component, e.g., in the case of successful training. A WTRU may use (e.g., may be configured to use) a trained AI component, e.g., in at least one aspect associated with decoding of downlink control information.

A WTRU may be configured to monitor and/or receive a first transmission and/or a second transmission. The first transmission may be a different type of transmission than the second transmission. For example, the first transmission may be a different type of transmission than the second transmission in terms of one or more of the following: waveform, subcarrier spacing, modulation, coding, bit arrangement, compression, etc. A second transmission may be generated (e.g., at least in part), for example, by an AI component. A first transmission may be associated with predefined signaling and/or a second transmission may be associated with learned signaling.

A WTRU may be configured to determine the presence of the second transmission, for example, based on one or more of the following: a preconfigured configuration, an indication in a first transmission, a preconfigured linkage configuration between first and second transmissions; or a configuration of a first transmission.

A preconfigured configuration may include one or more of the following: an aspect of time allocation (e.g., a starting symbol, a duration); a frequency allocation; a control resource set (CORESET) configuration; a search space configuration; a radio network temporary identifier (RNTI) configuration; a modulation and/or coding scheme; a transmission configuration index (TCI) state, a channel state information-reference signal (CSI-RS) resource indicator (CRI) and/or a sounding reference signal (SRS) resource index (SRI); a number of repetitions; a configured grant or a semi-persistent assignment configuration; a reference signal configuration; and/or a set of DCI formats. For example, a configuration (e.g., the preconfigured configuration described here) may be included in an RRC message. A configuration (e.g., the configuration included in an RRC message) may be semi-statically activated and/or deactivated, e.g., via a MAC control element (MAC-CE). FIG. 5 illustrates an example of tightly coupled predefined signaling and learned signaling, e.g., wherein predefined signaling and learned signaling are transmitted using a same time allocation (e.g., at the same time) and multiplexed in the frequency domain.

An indication in a first transmission may provide information explicitly or implicitly, e.g., about one or more configuration aspects of a second transmission.

A preconfigured linkage configuration between the first and second transmission may be configured explicitly or implicitly. A linkage may be in terms of time, frequency, and/or space. FIG. 6 illustrates an example of a linkage between predefined and learned signaling. A WTRU may be configured to receive predefined signaling and learned signaling in a first order (e.g., a certain first order), e.g., wherein a learned signaling that is linked to a predefined signaling may precede a next predefined signaling. FIG. 7 illustrates an example of a flexible linkage between predefined and learned signaling. A WTRU may be configured to receive predefined signaling and learned signaling in a second order (e.g., a certain second order), e.g., wherein a learned signaling that is linked to a predefined signaling may follow a next predefined signaling.

A WTRU may determine one or more configuration aspects that may be associated with a second transmission, for example, based on a configuration of a first transmission.

A second transmission may be different from a first transmission, for example, in one or more of the following ways (e.g., properties): modulation, constellation, channel coding, precoding, waveform, time, frequency resource, bit arrangement, compression, or the like.

A WTRU may monitor and/or receive (e.g., may be configured to monitor and/or receive) a second transmission. A second transmission may be generated (e.g., at least in part), for example, by an AI component. A configuration for a second transmission may be provided, for example, in one or more ways (e.g., as described herein).

A WTRU may be configured with a mapping between a set of specified configurations and associated learned signaling.

A WTRU may be configured with a set of signaling configurations (e.g., a set of specified signaling configurations), for example, as an alternative to transmission (e.g., explicit transmission) of predefined signaling. A WTRU may be (pre)configured with a mapping between specified signaling and an aspect associated with a second transmission. For example, a mapping between specified signaling and transmission occasions and/or resources for a second transmission may be (pre)configured for a WTRU. A WTRU may be configured to use a mapping (e.g., as described here) to generate labels for training data, e.g., to train the AI component. A set of specified signaling and the mapping may provide a function similar to the first transmission.

A WTRU may be configured to train an AI component, for example, using the first and/or second transmission (e.g., configured as described herein). A WTRU may train (e.g., may be configured to train) an AI component, for example, so that the second transmission is an input to the AI component. A WTRU may use (e.g., may be configured to use) a first transmission as a desired output/target output/label for training. A WTRU may be configured to train an AI component, for example, so that the AI component (e.g., if given the second transmission as input) may produce an output that equals (e.g., is the same as), similar to, resembles, or produces the same semantics as, the first transmission. A WTRU may be configured to use a portion of a first transmission as a desired output/target output/label for training an AI component.

A WTRU may be configured to process a first transmission, for example, using a rule-based component to obtain a first output. A WTRU may be configured to use a first output from a rule-based component as a desired output/target output/label for training an AI component, for example, if given a second transmission as input. The term "first transmission" and "a processed first transmission/first output" may be used interchangeably. Methods described herein (e.g., as non-limiting examples) may be applicable if a portion of a first transmission is used for a target output for training.

FIG. 8 illustrates an example of training an AI component at a WTRU. A WTRU may be configured to receive transmission(s) of a first type (e.g., predefined signaling) and transmission(s) of a second type (e.g., learned signaling). The WTRU may be configured with a linkage between the predefined signaling and the associated learned signaling. The WTRU may receive one or more of (e.g., a plurality of) transmissions of a first type and/or one or more of (e.g., a plurality of) transmissions of a second type. The WTRU may be configured to apply the learned signaling as input to the AI component, for example, to perform forward pass and produce an output. In the case that the AI component is untrained or not trained sufficiently, the output may be different (e.g., significantly different) from the linked predefined signaling. The WTRU may be configured to calculate a value, e.g., a value indicating a difference between the current output and expected predefined signaling. The difference may be configured via a loss function. The WTRU may be configured to train the AI component, e.g., so that the difference between the output and the linked predefined signaling may be minimized. The training may involve backpropagation of gradients and/or updating one or more learnable parameters of the AI component.

FIG. 9 illustrates an example of training an AI component at a WTRU. A WTRU may be configured to receive transmission(s) of a first type (e.g., predefined signaling) and transmission(s) of a second type (e.g., learned signaling). The WTRU may be configured with a linkage between the predefined signaling and the associated learned signaling. The WTRU may receive one or more of (e.g., a plurality of) transmissions of a first type and/or one or more of (e.g., a plurality of) transmissions of a second type. The WTRU may be configured to apply the learned signaling as input to the AI component, for example, to perform a forward pass and produce an output. The WTRU may be configured to apply the predefined signaling as input to a rule-based component. The output of a rule-based component may be configured as a target output. When the AI component is untrained or not sufficiently trained, the output of AI component may be different (e.g., significantly different) from the target output of the rule-based component. The WTRU may be configured to calculate a value, e.g., a value indicating a difference between the AI component output and the target output from the rule-based component. The difference may be configured via a loss function. The WTRU may be configured to train the AI component, e.g., so that the difference between the AI component output and the target output from the rule-based component may be minimized. The training may involve backpropagation of gradients and/or updating one or more learnable parameters of the AI component.

A WTRU may be configured to train an AI component in a supervised learning paradigm, for example, by using a second transmission as input and a first transmission as a target label/output. A WTRU may be configured to apply supervised learning, for example, based on a deep learning algorithm or one or more variants (e.g., any variants) thereof. A WTRU may use convolutional layer(s) for dimensionality reduction. A WTRU may be configured to apply supervised learning, for example, based on support vector machine(s) or one or more variants thereof. Training may involve minimizing a loss function and/or (e.g., equivalently) maximizing an objective function. In some examples, such as if given input as the second transmission to the AI component, a loss function for a WTRU may be configured as a difference between an output of an AI component and a first transmission. A WTRU may be configured with a cross-entropy loss function or a mean squared error loss function. A WTRU may be configured to perform a set of preprocessing on a received second transmission. Preprocessing may include normalization, stacking real, imaginary parts, and/or the like.

A WTRU may be configured to perform training, for example, based on a set of data samples. A set of data samples may include multiple pairs of a first transmission and a second transmission. A WTRU may be (pre)configured with a number of data samples, for example, in terms of a number of transmission occasions and/or periodicity and/or in terms of parameter(s) of a configured grant. A WTRU may be signaled (e.g., explicitly), e.g., in a training step, with the start and stop of transmissions associated with data samples. A WTRU may receive first and second transmissions, e.g., during a training step. A WTRU may be configured to adjust the learnable parameters of an AI component (e.g., weights and/or biases), for example, to minimize a loss function. A WTRU may determine that training is complete, for example, based on a condition associated with a loss function. A WTRU may determine that training is complete, for example, if the magnitude of a loss function is below a threshold (e.g., a (pre)configured threshold).

A WTRU may be configured for training, for example, based on a multi-step approach (e.g., a two-step approach). In a step (e.g., a first step), a WTRU may be configured to perform training (e.g., as described herein). In a step (e.g., a second step), a WTRU may be configured to receive a set of data samples, which may be considered as test data samples. A WTRU may be configured to evaluate the quality of training done (e.g., performed or completed in a first step), for example, based on test data samples (e.g., the test data samples received in a second step). A WTRU may be configured to freeze the learnable parameters of an AI component (e.g., during a second step) and may use the test data samples to calculate a loss function. A WTRU may be configured to transmit an indication (e.g., to the network), for example, if the loss function evaluated on a test data sample is below a threshold (e.g., a (pre)configured threshold).

A WTRU may determine that training is complete if one or more of the following are true: a condition associated with a loss function (e.g., if calculated based on a set of training data samples) is below a threshold (e.g., a first threshold); or a condition associated with a loss function (e.g., if calculated based on a set of test data samples) is below a threshold (e.g., a second threshold).

A WTRU may determine that training is complete based on a number of epochs, wherein the number of epochs may define a number of times the training processes a set of data samples (e.g., an entire set of training data samples). A number of epochs may be (pre)configured by the network. A WTRU may be configured to select learnable parameters (e.g., weights and/or biases) of an AI component, such as learnable parameters that may lead to a lowest loss on training and/or test data, e.g., within the configured number of epochs.

A WTRU may determine that training is complete based on expiry of a duration of time (e.g., expiry of a timer). The value of a duration of time (e.g., a timer) may be (pre) configured by the network. A WTRU may be configured to select learnable parameters (e.g., weights and/or biases) of an AI component, such as learnable parameters that may lead to the lowest loss on training and/or test data, e.g., within the configured training time.

A WTRU may determine that training is complete based on an earliest (e.g., a first occurrence) of the following conditions: the loss function is below a threshold; expiry of a time duration (e.g., expiry of a timer); or completion of a preconfigured number of epochs.

A WTRU may be configured to process a first transmission using a rule-based component or a trained AI component. A WTRU may perform one or more actions, for example, based on signaling contained in a first transmission.

An indication of training status may be provided (e.g., by a WTRU to a network). A WTRU may be configured to indicate the status of an AI component to the network. An indication may be triggered, for example, based on one or more of the following: a request (e.g., an explicit request) from a network; a periodic indication; or occurrence(s) of one or more (pre)configured events.

An indication of the status of an AI component may be triggered, for example, based on a request (e.g., an explicit request) from a network. A WTRU may be configured to transmit the status of an AI component, for example, based on (e.g., in response to receiving) a request (e.g., aperiodic or a one-shot request) from the network. A DCI or one or more bits therein may indicate a request for aperiodic reporting of the status.

An indication of the status of an AI component may be triggered, for example, based on a periodic indication. A WTRU may be configured to transmit the status of AI component, for example, semi-statically or periodically (e.g., until indicated otherwise). A WTRU may be configured to transmit an indication, for example, after processing N training data samples. The value of N may be (pre) configured. Reporting may be configured to occur, for example, semi-persistently. Reporting (e.g., semi-persistent reporting) may be indicated (e.g., activated and/or deactivated), for example, by MAC CE signaling.

An indication of the status of an AI component may be triggered, for example, based on one or more pre-configured events. A WTRU may be configured to transmit the status of an AI component, for example, based on (e.g., in response to occurrence(s) of) one or more pre-configured events. An event may be one or more of a criterion based on a loss function, a criterion based on a number of epochs, or a criterion based on expiry of a time duration (e.g., expiry of a timer).

A WTRU may be configured to transmit an indication related to the status of an AI component. The status of an AI component may include the training status. The status may be expressed, for example, in terms of a loss function. A WTRU may send an indication (e.g., a one-bit indication) (e.g., of status), for example, if the magnitude of the loss function is below a (pre)configured threshold. An indication may be configured, for example, as a scheduling request. Resources for a scheduling request may be configured, for example, for an indication of training status. A priority of a scheduling request may be configured, for example, to be a highest priority. The priority of a scheduling request may be configured (e.g., dynamically).

A WTRU may be configured to transmit (e.g., to a network) the magnitude of a loss function or a statistic thereof. Reporting may occur (e.g., may be configured to occur), for example, periodically. A WTRU may be configured with one or more physical uplink control channel (PUCCH) resources, for example, to report the magnitude of a loss function. A WTRU may report (e.g., may be configured to report) loss function magnitude on a training data set and/or a test data set.

A quantized form of loss function magnitude may be reported (e.g., in one or more methods described herein). The loss function magnitude may be divided into different ranges. A WTRU may be configured to indicate one or more logical identities associated with one or more of the different ranges (e.g., a logical identify associated with each of the different ranges).

Learned signaling may be processed (e.g., by a WTRU). A WTRU may be configured to monitor/receive a transmission of a first type and a transmission of a second type. A WTRU may determine the presence of the transmission of the second type, for example, based on an indicator or a configuration. An indicator may be associated with (e.g., of) the transmission of the first type. A configuration may be an RRC configuration or a MAC CE activating a configuration.

A WTRU may be configured to use an AI component with learned parameters to process received transmissions. One or more received transmissions may be configured to be of a transmission of a second type. One or more received transmissions may be configured to use learned signaling.

A WTRU may monitor (e.g., may be configured to monitor) for an explicit trigger and/or an implicit trigger, e.g., from the network, to use an AI component with updated learned parameters, e.g., from online training. A trigger may be based on an indication (e.g., an explicit indication), which may be carried in RRC signaling, a MAC CE, and/or a DCI. A trigger may be based on a trigger (e.g., an implicit trigger), for example, based on an indication associated with an identity and/or version of an AI component. An identity may indicate that a WTRU may use (e.g., may start to use) an AI component that may be associated with the signaled identity to process transmission(s) of a second type.

A WTRU may be configured to apply a second type of processing for transmission(s) of a second type. A second type of processing may be based on (e.g., at least in part based on) a trained AI component. A WTRU may be configured to apply a second type of processing for a preprocessed version of transmission(s) of a second type. Preprocessing may be performed, for example, by a rule-based component or an AI component (e.g., another AI component). A WTRU may be configured to determine at least one output from an AI component, for example, based on a second type of processing. A WTRU may be configured to perform subsequent processing, for example, based on an output of an AI component. A WTRU may be configured to perform one or more actions, for example, based on an output of an AI component.

FIG. 10 illustrates an example processing of learned signaling. A WTRU may be configured to monitor/receive learned signaling. The learned signaling may be multiplexed in time/frequency/space with predefined signaling. The WTRU may be configured to activate an AI component to process learned signaling. The activated AI component may be a trained component. The WTRU may be configured to apply the learned signaling as input to the AI component and may perform a forward pass/inference to obtain an output. The output of the AI component may correspond to a control message. The output may correspond to predefined signaling. The WTRU may be configured to comply and/or may perform one or more actions based on the control message.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well. For example, while the system has been described with reference to a 3GPP, 5G, and/or NR network layer, the envisioned embodiments extend beyond implementations using a particular network layer technology. Likewise, the potential implementations extend to all types of service layer architectures, systems, and embodiments. The techniques described herein may be applied independently and/or used in combination with other resource configuration techniques.

The processes described herein may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read-only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

It is understood that the entities performing the processes described herein may be logical entities that may be implemented in the form of software (e.g., computer-executable instructions) stored in a memory of, and executing on a processor of, a mobile device, network node or computer system. That is, the processes may be implemented in the form of software (e.g., computer-executable instructions) stored in a memory of a mobile device and/or network node, such as the node or computer system, which computer-executable instructions, when executed by a processor of the node, perform the processes discussed. It is also understood that any transmitting and receiving processes illustrated in figures may be performed by communication circuitry of the node under control of the processor of the node and the computer-executable instructions (e.g., software) that it executes.

The various techniques described herein may be implemented in connection with hardware or software or, where appropriate, with a combination of both. Thus, the implementations and apparatus of the subject matter described herein, or certain aspects or portions thereof, may take the form of program code (e.g., instructions) embodied in tangible media including any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable devices, the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs are preferably implemented in a high level procedural or object-oriented programming language to communicate with a computer system. However, the program(s) can be implemented in assembly or machine language, if desired. In any case, the language may be a compiled or interpreted language and combined with hardware implementations.

Although example embodiments may refer to utilizing aspects of the subject matter described herein in the context of one or more stand-alone computing systems, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be affected across a plurality of devices. Such devices might include personal computers, network servers, handheld devices, supercomputers, or computers integrated into other systems such as automobiles and airplanes.

In describing the preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

What is claimed:

1. A wireless transmit-receive unit (WTRU), the WTRU comprising:
   a processor, the processor configured to:
   receive a first transmission and a second transmission, wherein the first transmission is a first type of transmission and the second transmission is a second type of transmission different from the first type of transmission;
   determine that the first transmission and the second transmission are linked;
   determine first control information based on the first transmission and a pre-defined processing rule;
   provide the second transmission as a first input to an artificial intelligence (AI) component, wherein the second transmission being provided as the first input to the AI component causes the AI component to generate second control information as a first output;
   determine a loss value based on at least a first difference associated with the first control information and the second control information;
   train the AI component based on the loss value, wherein the AI component being trained causes the AI component to generate third control information as a second output, and wherein a second difference associated with the first control information and the third control information is less than the first difference;
   determine that the training of the AI component satisfies a condition; and
   transmit, to a network, an indication of the determination that the training of the AI component satisfies the condition.

2. The WTRU of claim 1, wherein the first type of transmission is rule-based and the second type of transmission is AI component-based.

3. The WTRU of claim 1, wherein the first transmission and the second transmission differ in one or more of waveform, modulation, bit arrangement, precoding, or compression.

4. The WTRU of claim 1, wherein the first transmission and the second transmission are linked based on a time frequency relationship, and wherein the time frequency relationship is based on control resource set (CORESET) configuration information or search space configuration information.

5. The WTRU of claim 1, wherein the pre-defined processing rule is associated with a rule-based component.

6. The WTRU of claim 1, wherein the determination that the training of the AI component satisfies the condition is based on the loss value being below a threshold.

7. The WTRU of claim 1, wherein the first difference associated with the first control information and the second control information comprises a difference between a first part of the first control information and a first part of the second control information.

8. The WTRU of claim 1, wherein the processor is further configured to receive a command indicating to activate the trained AI component.

9. The WTRU of claim 1, wherein the processor is further configured to receive a third transmission, wherein the third transmission is of the second type of transmission, and apply the third transmission as input to the trained AI component to obtain a third output corresponding to a control message.

10. The WTRU of claim 9, wherein the processor is further configured to perform one or more actions based on the control message.

11. A method performed by a wireless transmit-receive unit (WTRU), the method comprising:

receiving a first transmission and a second transmission, wherein the first transmission is a first type of transmission and the second transmission is a second type of transmission different from the first type of transmission;

determining that the first transmission and the second transmission are linked;

determining first control information based on the first transmission and a pre-defined processing rule;

providing the second transmission as a first input to an artificial intelligence (AI) component, wherein the second transmission being provided as the first input to the AI component causes the AI component to generate second control information as a first output;

determining a loss value based on at least a first difference associated with the first control information and the second control information;

training the AI component based on the loss value, wherein the AI component being trained causes the AI component to generate third control information as a second output, and wherein a second difference associated with the first control information and the third control information is less than the first difference;

determining that the training of the AI component satisfies a condition; and transmitting, to a network, an indication of the determination that the training of the AI component satisfies the condition.

12. The method of claim 11, wherein the first type of transmission is rule-based and the second type of transmission is AI component-based.

13. The method of claim 11, wherein the first transmission and the second transmission differ in one or more of waveform, modulation, bit arrangement, precoding, or compression.

14. The method of claim 11, wherein the first transmission and the second transmission are linked based on a time frequency relationship, and wherein the time frequency relationship is based on control resource set (CORESET) configuration information or search space configuration information.

15. The method of claim 11, wherein the pre-defined processing rule is associated with a rule-based component.

16. The method of claim 11, wherein the determination that the training of the AI component satisfies the condition is based on the loss value being below a threshold.

17. The method of claim 11, wherein the first difference associated with the first control information and the second control information comprises a difference between a first part of the first control information and a first part of the second control information.

18. The method of claim 11, further comprising receiving a command indicating to activate the trained AI component.

19. The method of claim 11, further comprising receiving a third transmission, wherein the third transmission is of the second type of transmission, and applying the third transmission as input to the trained AI component to obtain a third output corresponding to a control message.

20. The method of claim 19, further comprising performing one or more actions based on the control message.

* * * * *